United States Patent
Zanelli (10) Patent No.: US 11,541,592 B2
(45) Date of Patent: Jan. 3, 2023

(54) DEVICE FOR BLOW MOLDING CONTAINERS

(71) Applicant: SACMI IMOLA S.C., Imola (IT)

(72) Inventor: Matteo Zanelli, Imola (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 17/673,303

(22) Filed: Feb. 16, 2022

(65) Prior Publication Data

US 2022/0258405 A1 Aug. 18, 2022

(30) Foreign Application Priority Data

Feb. 16, 2021 (IT) .................. 102021000003437

(51) Int. Cl.
| | |
|---|---|
| *B29C 49/56* | (2006.01) |
| *B29C 49/36* | (2006.01) |
| *B29L 31/00* | (2006.01) |

(52) U.S. Cl.
CPC .............. *B29C 49/56* (2013.01); *B29C 49/36* (2013.01); *B29C 49/5602* (2022.05); *B29C 49/5613* (2022.05); *B29L 2031/712* (2013.01)

(58) Field of Classification Search
CPC .. B29C 49/56; B29C 49/5602; B29C 49/5613
See application file for complete search history.

(56) References Cited

U.S. PATENT DOCUMENTS

| | | | |
|---|---|---|---|
| 2010/0156009 A1* | 6/2010 | Voth ..................... | B29C 49/4236 425/538 |
| 2010/0203187 A1* | 8/2010 | Schmid .................. | B29C 49/56 425/541 |
| 2016/0001487 A1* | 1/2016 | Yang ....................... | B29C 49/56 425/540 |
| 2016/0361858 A1 | 12/2016 | Nava et al. | |

FOREIGN PATENT DOCUMENTS

| | | |
|---|---|---|
| CN | 205148879 U | 4/2016 |
| EP | 2144742 A1 | 1/2010 |
| EP | 2861406 A1 | 4/2015 |
| EP | 3380300 A1 | 1/2020 |
| FR | 2841495 A1 | 1/2004 |
| WO | 2006029585 A1 | 3/2006 |
| WO | 2007012309 A2 | 2/2007 |
| WO | 2008138293 A1 | 11/2008 |
| WO | 2013189729 A1 | 12/2013 |
| WO | 2017089296 A1 | 6/2017 |

OTHER PUBLICATIONS

IT Search Report dated Oct. 29, 2021 re: Application No. 202100003437.

* cited by examiner

*Primary Examiner* — Robert B Davis (74) *Attorney, Agent, or Firm* — Cantor Colburn LLP (57) ABSTRACT

A device for blow molding containers, provided with a supporting frame for at least one station for blow molding preforms in order to obtain containers, the blow molding station includes two lateral bodies and a bottom which are adapted to provide by blow molding at least one container, at least one of the two lateral bodies being movable on (Continued)

command by virtue of elements for cyclic opening and closing, with respect to the supporting frame, about an articulation axis which is substantially parallel to the axis of the container.

9 Claims, 7 Drawing Sheets

Fig. 7

DEVICE FOR BLOW MOLDING CONTAINERS

CROSS-REFERENCE TO RELATED APPLICATIONS

This application is related to and claims the benefit of Italian Patent Application No. 102021000003437, filed on Feb. 16, 2021, the contents of which are herein incorporated by reference in their entirety.

TECHNICAL FIELD

The present disclosure relates to a device for blow molding containers made of plastic and particularly made of PET, PE, PEN, and similar materials.

BACKGROUND

Plants for blow molding plastic containers are known which comprise an apparatus for blow molding preforms having blow molding stations arranged on rotating advancement wheels and the mold support hinged along one edge.

Apparatuses are also known in which the blow molding stations are fixed (suitable in particular to accommodate cavities for forming containers): in this case, plates arranged parallel to each other are normally used as mold supports.

The execution of the movements for opening and closing the blow molding station, as well as the execution of the movements for lifting the base portion (or bottom), are normally actuated mechanically.

Curved segments (cams) are used in particular in blow molding stations arranged on rotating advancement wheels and are arranged so as to be fixed on the frame of the machine, cam followers being driven along said segments and being connected to the elements to be moved.

WO2007/012309 describes a blow molding station in which the base portion is moved longitudinally with respect to the blow molding station and in which one mold support is fixed and the other support is movable.

FR2841495 instead describes a mold which has a base portion which can move in an axial direction with respect to the lateral supports of the mold.

WO2006/029585 describes a blow molding station in which a mechanical coupling is provided between the lateral supports of the mold and the base portion.

In order to try to obtain high compactness, it is preferable to use solutions in which one lateral support of the mold is fixed and one is movable, but in this case it becomes problematic to manage the movement for lifting the base portion or bottom, since in order to ensure optimum blow molding it is essential to obtain a shape mating between the lateral supports of the mold and the base portion.

EP 2144742 B1 in the name of KHS CORPOPLAST describes a device for blow molding containers that has a blow molding station arranged on a supporting structure for the molding of preforms.

In this case, the blow molding station is provided with two side walls of the mold and with a base portion or bottom.

One of the side walls is fixed while the other one can be oriented with respect to the supporting structure.

The bottom can move with respect to each of the two side walls of the mold.

Specifically, the side walls of the mold are mechanically coupled together in order to perform positioning movements, while the bottom has a movement trajectory, with respect to the side walls, that has both a component which is extended in a longitudinal direction of the blow molding station and a component that is extended transversely to the longitudinal direction.

The solution proposed above has a certain constructive complexity due to the movement trajectory of the bottom.

EP 3380300 B1 in the name of this same Applicant describes a device for blow molding containers which has a supporting frame for at least one station for blow molding preforms in order to obtain containers, which comprises two lateral bodies and a bottom adapted to provide by blow molding at least one container, at least one of the two lateral bodies being movable on command by virtue of means for cyclic opening and closing, with respect to the supporting frame, about an articulation axis.

The device is provided with means for kinematic connection between the movable lateral body and the bottom which are adapted to produce cyclically the movement of the bottom along a movement direction that is substantially parallel to the articulation axis.

The means for cyclic opening and closing comprise an actuation body which is supported by a connecting linkage, which can move with respect to the supporting frame about a hinge axis which is substantially parallel to the articulation axis; the connecting linkage is kinematically connected to the movable lateral body and is associated rotatably with a contoured body, which can move along a rectilinear trajectory and forms a cam-like profile which can be engaged by an engagement element supported by the bottom.

Although this solution is valid from the conceptual standpoint, it has some limitations.

In particular, in order to ensure the possibility to move the contoured body along the rectilinear trajectory, an interconnection rod is provided which is hinged respectively to the actuation connecting rod and to the contoured body.

First of all, it is noted that the presence of the interconnection rod produces a certain difficulty in assembly, as well as the need for greater assembly precision in order to try to reduce plays.

Furthermore, the practical implementation of this solution requires the use of respective bearings at the ends of the interconnection rod.

Another drawback of this solution relates to the fact that by rotationally coupling the ends of the interconnection rod, respectively to the actuation connecting rod and to the contoured body, a constraint is created for the movement of the interconnection rod along an axis that is vertical during use and makes it complicated to key the actuation connecting rod and, if necessary, to act on the mold parts.

SUMMARY

The aim of the present disclosure is to solve the problems and obviate the drawbacks described above, providing a device for blow molding plastic containers that is extremely easy and practical in use.

Within this aim, the disclosure provides a device for blow molding plastic containers that is extremely simple from the constructive standpoint and is capable of allowing an optimum management of the process.

The disclosure also provides a blow molding device that is flexible in its use.

This aim, as well as these and other advantages which will become better apparent hereinafter, are achieved by providing a device for blow molding plastic containers according to claim 1.

BRIEF DESCRIPTION OF THE DRAWINGS

Further characteristics and advantages of the disclosure will become better apparent from the description of some preferred but not exclusive embodiments of a device for blow molding plastic containers according to the disclosure, illustrated by way of non-limiting example in the accompanying figures, wherein.

DETAILED DESCRIPTION OF THE DRAWINGS

Figure 1:
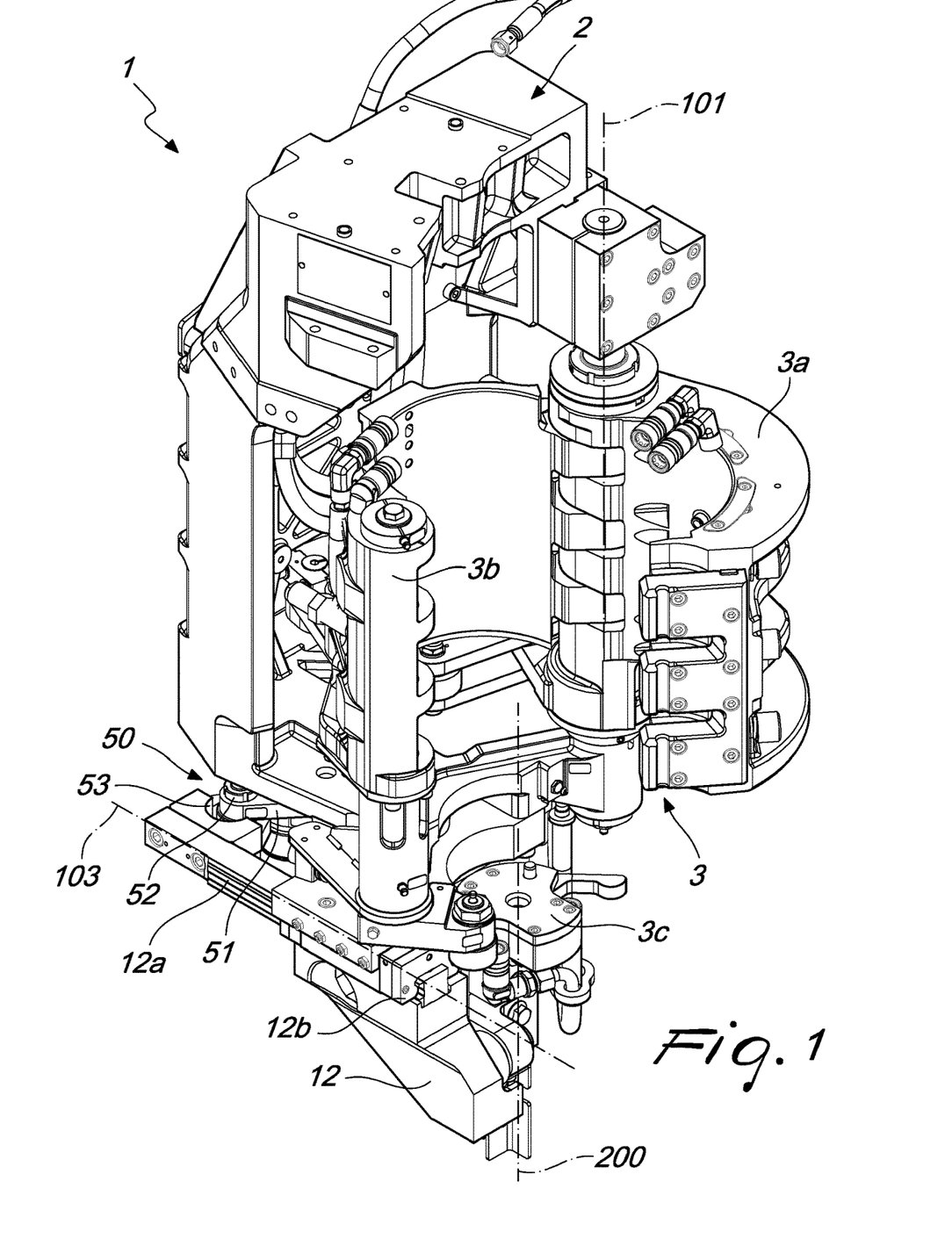
FIG. 1 is a perspective view of the device for blow molding plastic containers according to the disclosure in the open configuration.
Figure 2:
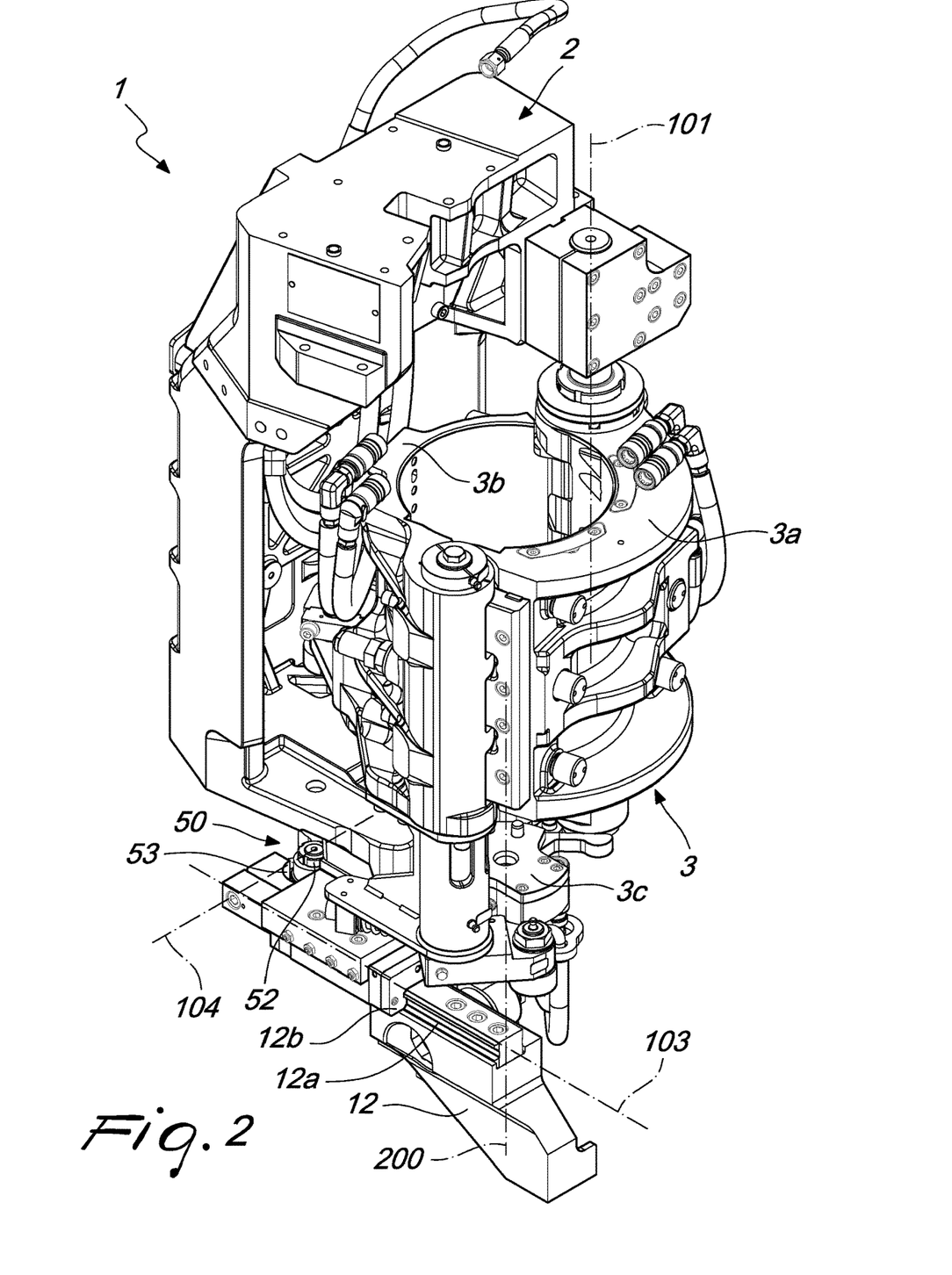
FIG. 2 is a view, similar to FIG. 1, with the blow molding device in the closed condition.
Figure 3:
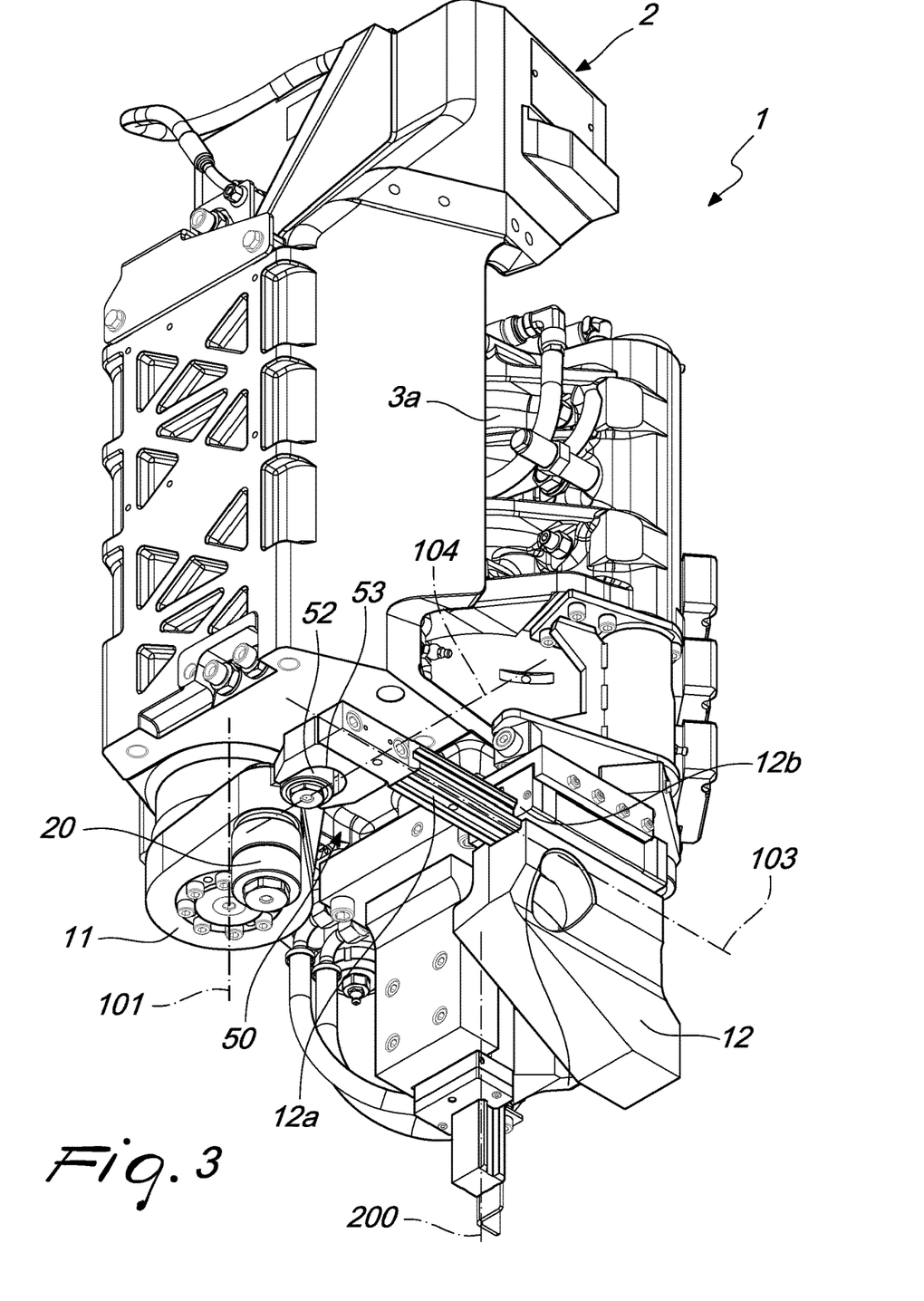
FIG. 3 is a perspective view, taken from another viewpoint, of the blow molding device in the open condition.
Figure 4:
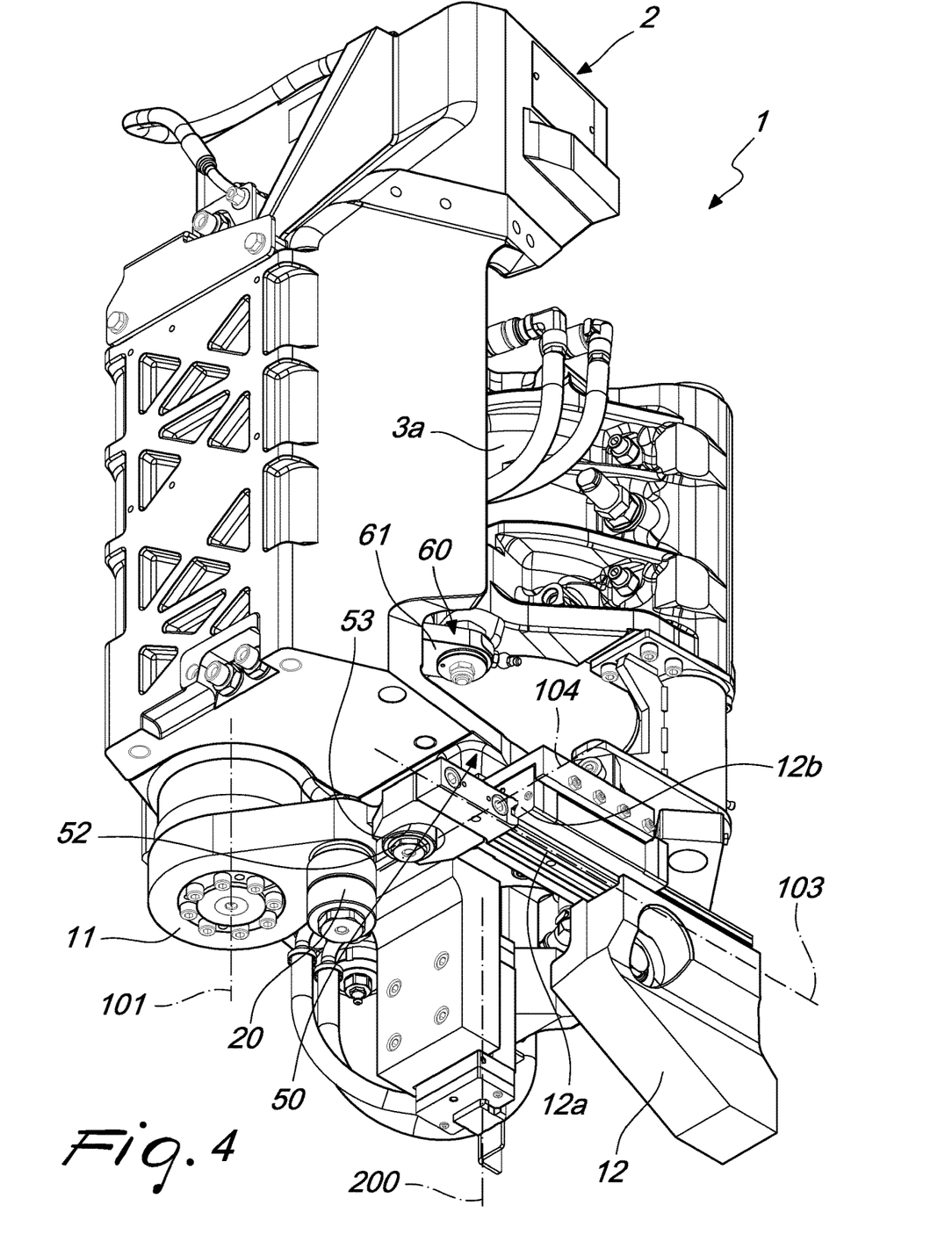
FIG. 4 is a view, similar to FIG. 3, with the blow molding device in the closed condition.
Figure 5:
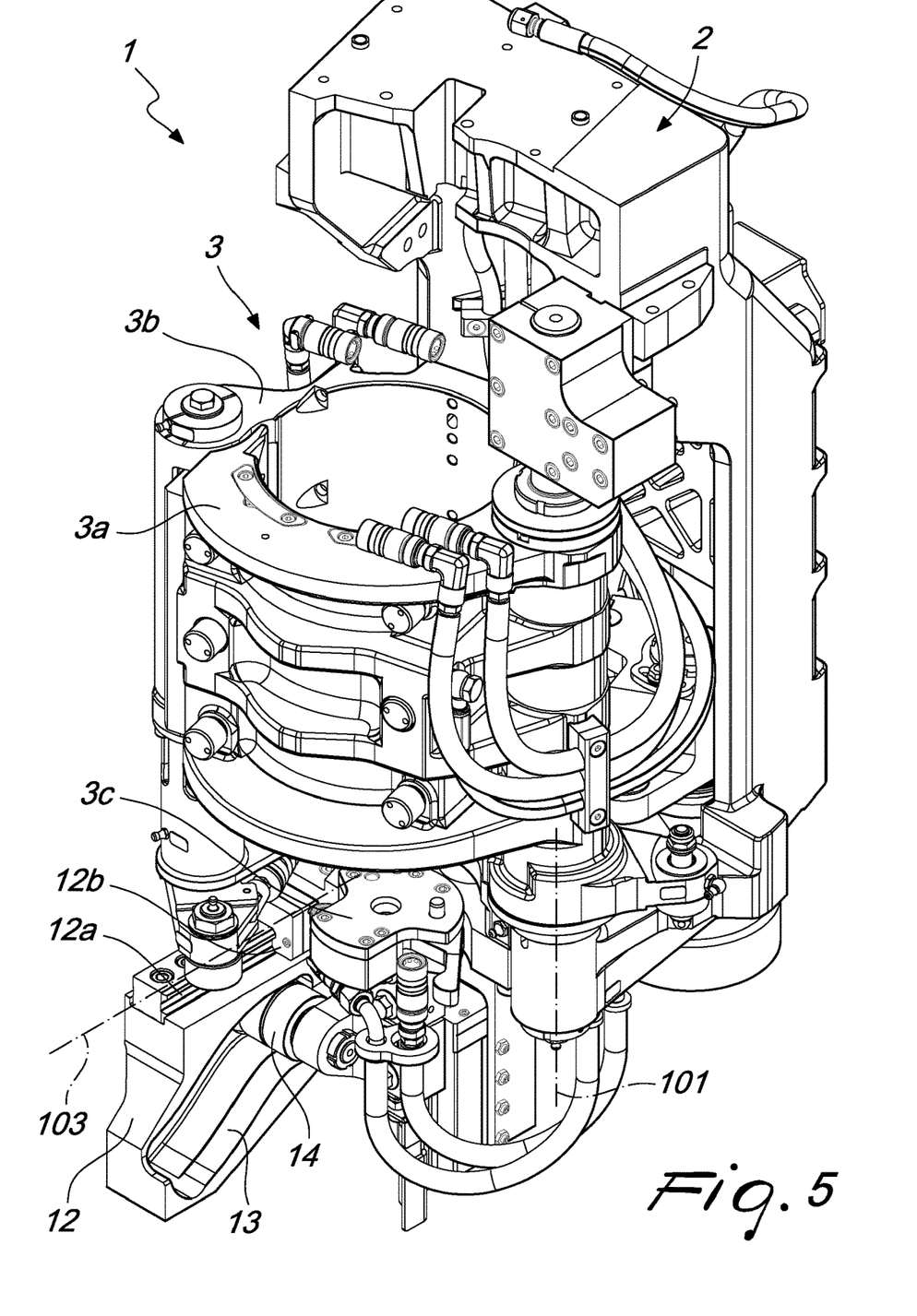
FIG. 5 is a perspective view of the blow molding device in the closed condition.
Figure 6:
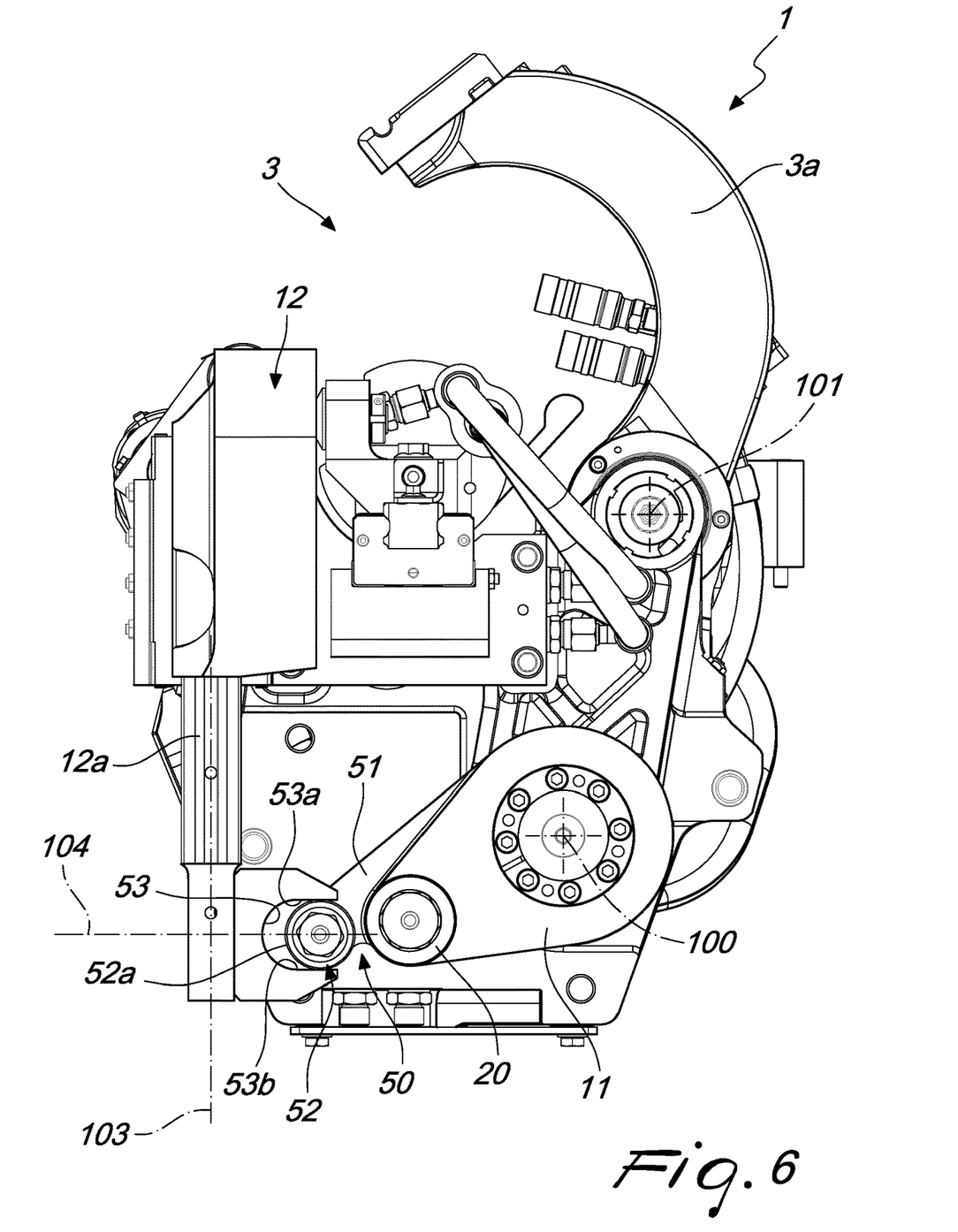
FIG. 6 is a bottom view of the device for the blow molding of plastic containers according to the disclosure in the open condition.
Figure 7:
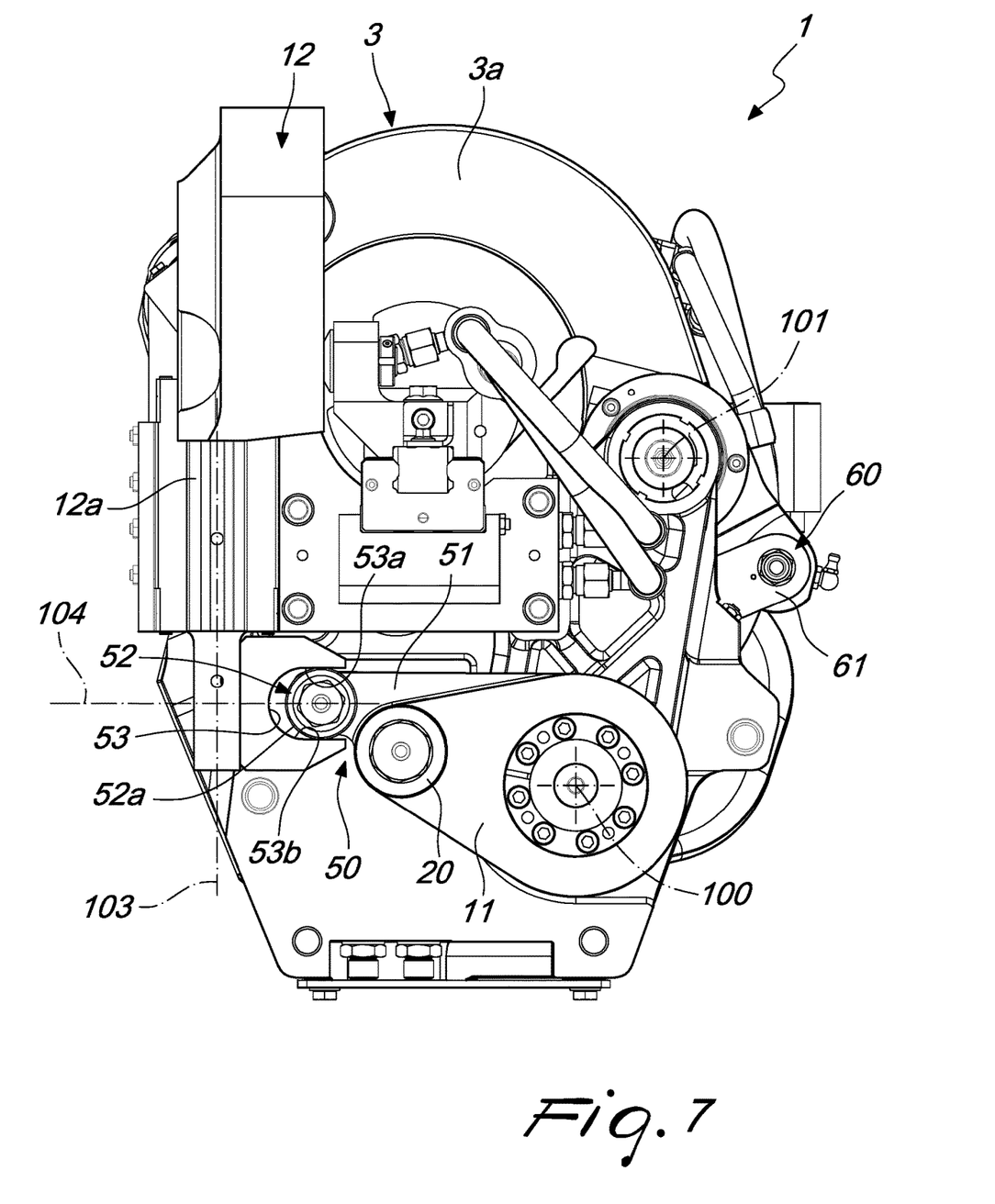
FIG. 7 is a view, similar to FIG. 6, with the blow molding device in the closed condition.

In the embodiments that follow, individual characteristics, given in relation to specific examples, may actually be interchanged with other different characteristics that exist in other embodiments.

With reference to the figures, the present disclosure relates to a device for blow molding containers, designated generally by the reference numeral 1, and provided with a supporting frame 2 for at least one station 3 for blow molding preforms in order to obtain containers.

The blow molding station 3 comprises two lateral bodies 3a, 3b and a bottom 3c adapted to provide by blow molding at least one container.

At least one of said two lateral bodies 3a, 3b is movable on command by virtue of means for cyclic opening and closing, with respect to the supporting frame 2, about an articulation axis 101 that is substantially parallel to the axis of said at least one container.

Preferably, both lateral bodies 3a, 3b can move on command about the articulation axis.

The blow molding device 1 is provided with means 60 for kinematic connection between the at least one movable lateral body 3 and the bottom 3c, which are adapted to produce cyclically the movement of the bottom 3c along a movement direction 200 which is substantially parallel to the articulation axis 101.

The cyclic opening and closing means comprise an actuation body 20, which is supported by a connecting linkage 11 which can move with respect to the supporting frame 2 about a pivoting axis 100 which is substantially parallel to the articulation axis 101.

Advantageously, the articulation axis 101 is parallel to and spaced from the pivoting axis 100.

However, the pivoting axis 100 may coincide with the articulation axis 101.

The connecting linkage 11 is kinematically connected to the movable lateral body 3a or to both lateral bodies 3a, 3b and is connected, by means of a connection assembly 50, to a contoured body 12.

The contoured body 12 can move, with respect to the supporting frame 2, along a substantially rectilinear movement trajectory 103.

Conveniently, the supporting frame 2 supports a sliding guide 12b, which is extended longitudinally parallel to the movement direction 103 and to which a longitudinal profile 12a, integral with the contoured body 12, is coupled slidingly.

The contoured body 12 forms in particular a cam-like profile 13 which can be engaged by at least one engagement element 14 supported by the bottom 3c.

According to the present disclosure, the connection assembly 50 comprises an actuation appendage 51 which rotates integrally with the connecting linkage 11 about the pivoting axis 100.

The actuation appendage 51 supports an abutment body 52, which engages slidingly in a sliding seat 53 which is integral with the contoured body 12.

The sliding seat 53 is extended along a sliding direction 104, which is incident with respect to the movement trajectory 103 and is substantially perpendicular to the pivoting axis 100.

According to a preferred embodiment, the sliding direction 104 is substantially perpendicular to the movement trajectory 103.

Preferably, the abutment body 52 comprises a roller 52a which has a roller axis 105 that is substantially parallel to the pivoting axis 100.

In particular, the roller 52a is mounted free on the actuation appendage 51.

Conveniently, the sliding seat 53 is formed between two abutment shoulders 53a, 53b which are parallel and mutually spaced.

According to one preferred embodiment, the distance between the two abutment shoulders 53a, 53b substantially corresponds to the diameter of the roller 52a.

The sliding seat 53 is substantially U-shaped and forms an open end portion 53a which is directed oppositely with respect to the contoured body 12.

Conveniently, the actuation lever system comprises the connecting linkage 11 connects the connecting linkage 11 to said movable lateral body 3a.

With reference to the embodiment shown in the figures, the kinematic connection means 60 comprise an actuation lever system 61 which connects the connecting linkage 11 to the at least one movable lateral body 3a.

The actuation lever system 61 acts, in particular, between the connecting linkage 11 and the movable lateral body 3a.

It is furthermore possible to connect, by means of an additional lever, the movable lateral body 3a to the other lateral body 3b, so as to produce the opening and closing movement of both lateral bodies 3a, 3b.

Conveniently, the kinematic connection means are configured to determine, as a consequence of the rotation of the movable lateral body 3a by a first angular extent about the articulation axis 101, a rotation of the other lateral body 3b by a second angular extent about the articulation axis 101.

Preferably, the second angular extent is greater than the first angular extent.

Advantageously, the engagement element 14 comprises a free roller.

The device 1 comprises a footing associated with a carousel (both not shown in the figures) which can rotate, with respect to the footing, about a carousel axis that is substantially parallel to the articulation axis 101 and supports a plurality of blow molding stations 3.

The footing supports at least one engagement track for the actuation bodies 20, so as to produce, during the rotation of the blow molding stations 3 about the carousel axis, a rotation of the respective connecting linkages 11 about the respective pivoting axis 100.

The operation of the device according to the disclosure is evident from what has been described above.

In practice, the movement, with respect to the supporting frame 2, of the connecting linkage 11 about the pivoting axis 100 cyclically produces the movement along the movement direction 102 of the bottom 3c and the opening and closing, by rotation about the articulation axis 101, of the movable lateral body 3a.

The rotation, with an oscillating motion, of the connecting linkages 11 about the respective pivoting axis 100 produces the opening and closing of the lateral bodies 3a and 3b, by virtue of the interposition of the actuation lever system 61, and the lifting and lowering of the bottom 3c, by virtue of the action of the contoured body 12.

The disclosure thus conceived is susceptible of numerous modifications and variations, all of which are within the scope of the inventive concept.

The particular configuration of the connection assembly 50 allows to ensure an effective transfer of the motion from the connecting linkage 11 to the contoured body 12.

Specifically, disengaging the abutment body 52 from the contoured body 12 allows to manage any plays and misalignments between the various components of the connection assembly 50.

Furthermore, the particular shape of the sliding seat 53 allows to easily disengage the connecting linkage 11 from the contoured body 12, facilitating maintenance and format changing operations.

In practice, the materials used, so long as they are compatible with the specific use, as well as the dimensions and shapes, may be any according to the requirements.

All the details may furthermore be replaced with other technically equivalent elements.

What is claimed is:

1. A device for blow molding containers, provided with a supporting frame for at least one station for blow molding preforms in order to obtain containers, said blow molding station comprising two lateral bodies and a bottom which are adapted to provide by blow molding at least one container, at least one of said two lateral bodies being movable on command by virtue of means for cyclic opening and closing, with respect to said supporting frame, about an articulation axis which is substantially parallel to an axis of said at least one container, kinematic connection means being provided for kinematic connection between said at least one movable lateral body and said bottom which are adapted to determine cyclically a movement of said bottom along a movement direction that is substantially parallel to said articulation axis, said means for cyclic opening and closing comprising an actuation body which is supported by a connecting linkage configured to be moved with respect to said supporting frame about a pivoting axis which is substantially parallel to said articulation axis, said connecting linkage being kinematically connected to said at least one movable lateral body and being connected, by virtue of a connection assembly, to a contoured body configured to move, with respect to said supporting frame, along a substantially rectilinear movement trajectory, said contoured body defining a cam-like profile configured to be engaged by at least one engagement element supported by said bottom, wherein said connection assembly comprises an actuation appendage which is integral in rotation with said connecting linkage about said pivoting axis, said actuation appendage supporting an abutment body which engages slidingly in a sliding seat which is integral with said contoured body, said sliding seat being extended along a sliding direction which is incident with respect to said movement trajectory and is substantially perpendicular with respect to said pivoting axis.

2. The device according to claim 1, wherein said sliding direction is substantially perpendicular with respect to said movement trajectory.

3. The device according to claim 1, wherein said abutment body comprises a roller which has a roller axis which is substantially parallel to said pivoting axis, said roller being mounted freely on said actuation appendage.

4. The device according to claim 1, wherein said sliding seat is formed between two parallel and mutually spaced abutment shoulders.

5. The device according to claim 4, wherein a distance between said two abutment shoulders substantially corresponds to the diameter of said roller.

6. The device according to claim 1, wherein said sliding seat is substantially U-shaped and forms an open end portion which is directed opposite with respect to said contoured body.

7. The device according to claim 1, wherein said kinematic connection means comprise at least one actuation lever system, which connects said connecting linkage to said at least one movable lateral body.

8. The device according to claim 1, wherein said at least one engagement element comprises a free roller.

9. The device according to claim 1, further comprising a footing associated with a carousel configured to rotate, with respect to said footing, about a carousel axis that is substantially parallel to said articulation axis and supports a plurality of blow molding stations, said footing supporting at least one engagement track for the actuation bodies so as to determine, during a rotation of said blow molding stations about the carousel axis, a rotation of the respective connecting linkages about the respective pivoting axis.

* * * * *